United States Patent [19]
Torres

[11] 3,930,937
[45] Jan. 6, 1976

[54] STEAM RELIEF VALVE CONTROL SYSTEM FOR A NUCLEAR REACTOR

[75] Inventor: Jose Marcelo Torres, Simsbury, Conn.

[73] Assignee: Combustion Engineering, Inc., Windsor, Conn.

[22] Filed: Apr. 2, 1973

[21] Appl. No.: 347,260

[52] U.S. Cl. ................................. 176/20; 176/19
[51] Int. Cl. ...... G21c 7/32; G21c 17/10; G21c 7/00
[58] Field of Search ............................... 176/19, 20

[56] References Cited
UNITED STATES PATENTS

| | | | |
|---|---|---|---|
| 3,332,849 | 7/1967 | Kagi | 176/20 R |
| 3,565,760 | 2/1971 | Parkos et al. | 176/19 R |
| 3,778,347 | 12/1973 | Giras et al. | 176/20 R |

Primary Examiner—Benjamin A. Borchelt
Assistant Examiner—Thomas H. Webb
Attorney, Agent, or Firm—Stephen L. Borst

[57] ABSTRACT

A turbine follow system and method for Pressurized Water Reactors utilizing load bypass and/or atmospheric dump valves to provide a substitute load upon load rejection by bypassing excess steam to a condenser and/or to the atmosphere. The system generates a variable pressure setpoint as a function of load and applies an error signal to modulate the load bypass valves. The same signal which operates the bypass valves actuates a control rod automatic withdrawal prevent to insure against reactor overpower.

3 Claims, 3 Drawing Figures

RATE OF LOAD DECREASE

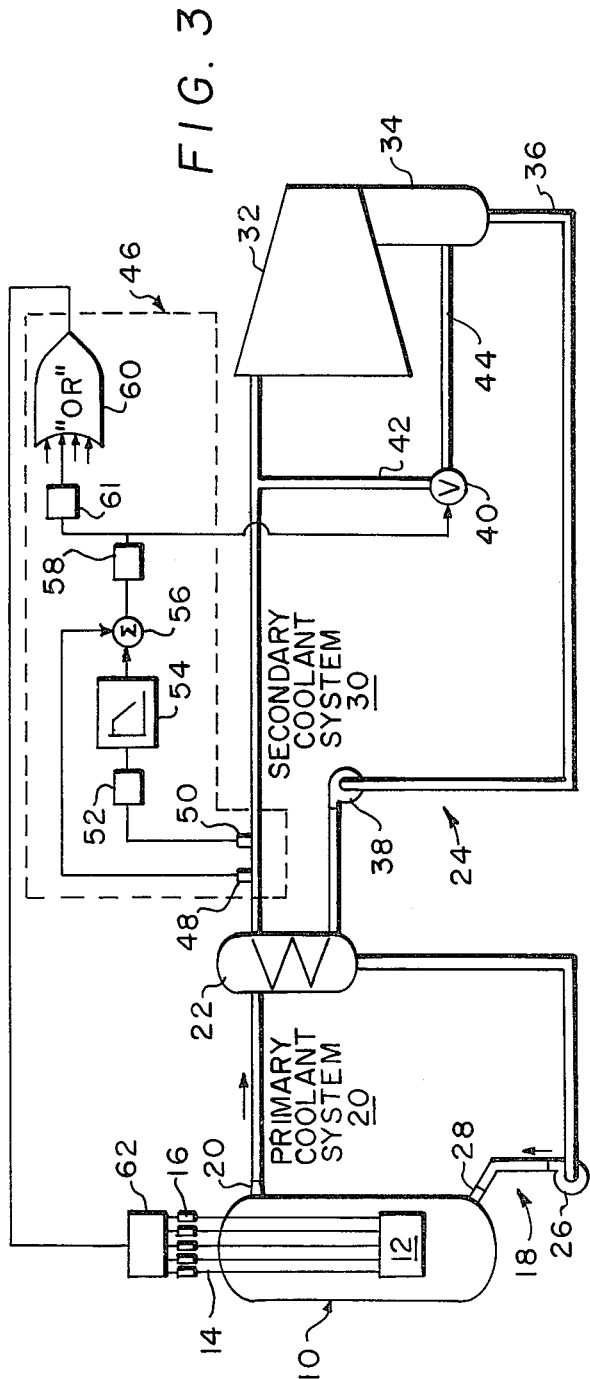
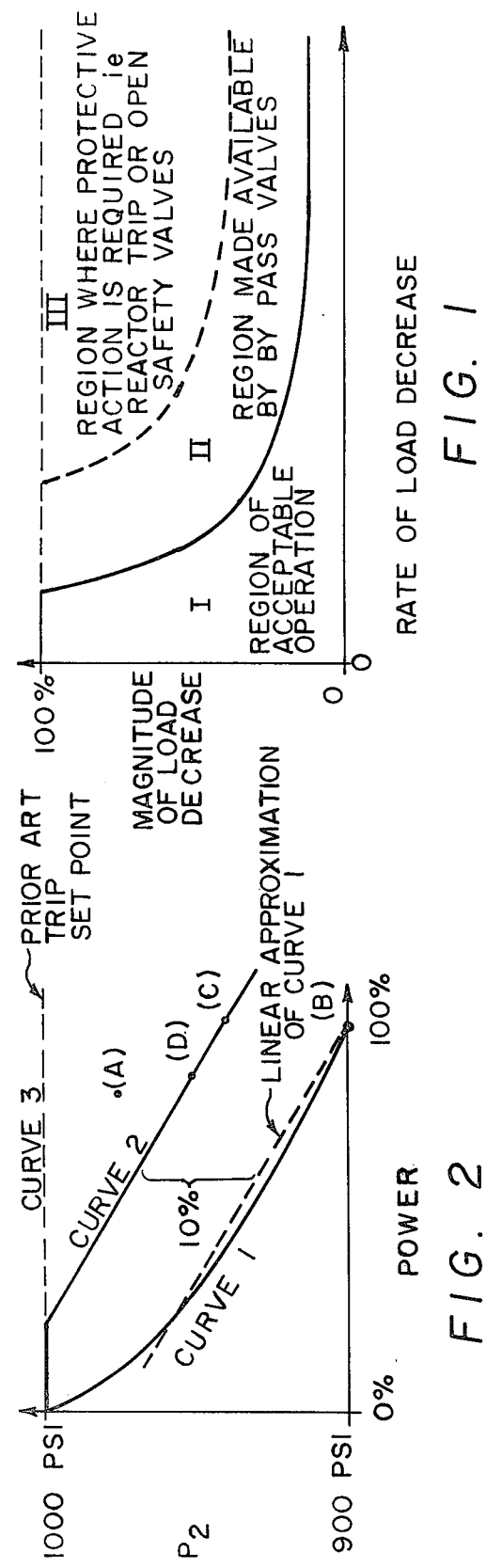

STEAM RELIEF VALVE CONTROL SYSTEM FOR A NUCLEAR REACTOR

DESCRIPTION OF THE BACKGROUND OF THE INVENTION

1. Description of the Field of the Invention

The principles for the generation of power by a nuclear reactor have been well established and are well understood. Briefly, the reactor contains uranium or plutonium fuel elements in a core arrangement. Through the mechanisms of neutron absorption and nuclear fission of the uranium or plutonium, large amounts of energy are released. This released energy manifests itself in the form of heat which is utilized to generate electricity. The heat is transferred to a primary coolant which continuously circulates through the core and carries the generated heat to a heat exchange boundary where a secondary coolant or working fluid is heated. Ordinarily the secondary coolant is water and is vaporized at the heat exchange boundary to produce steam. The steam is then circulated in a secondary system to a load for its ultimate use. In the power reactor context, the load is a turbine which is caused to turn at a predetermined rate. The turbine is then connected to a generator for the ultimate transformation of the thermal energy into electrical energy.

All elements of this system are functionally interrelated. As an example, an increase in reactor power increases the rate of energy transfer to the primary coolant which, in turn, increases the rate of energy transfer to the secondary coolant causing more energy provided to the load for its ultimate transformation into electrical energy. Conversely, if less electrical energy is required, the energy requirement of the turbine diminishes. The steam flow to the turbine is reduced and consequently, the turbine utilizes less of the thermal energy being transferred to the secondary coolant and an energy backup results. Since less energy is being drawn from the steam supply system when the steam flow is reduced, both the temperature and pressure of the steam generator secondary side are caused to increase. The effect of this increase in secondary coolant temperature is reflected on the primary side of the heat exchanger since less energy can be transferred across the heat exchange boundary. Accordingly, both the primary coolant's temperature and pressure increase. This trend continues until the reactor regulating system, which is programmed to keep the average temperature of the primary coolant on a specified program, returns the system to acceptable values by cutting back on the reactor's power by driving regulating rods into the core.

Since the regulating rods can only be slowly advanced into the core at a limited maximum speed, the reactor regulating system is unable to prevent a serious increase in primary and secondary pressures and temperatures if the magnitude and rate of energy backup described above exceed certain values. Among other things the energy backup is dependent on the magnitude and rate of decrease in load: called a load rejection. Ordinarily, the reactor and steam supply systems are designed to be able to withstand a load rejection of approximately ten percent and a rate of load rejection of five percent per minute (see FIG. 1), but if the load rejection or rate of load rejection exceed these values, the reactor regulating system is unable to compensate rapidly enough for the energy backup and the temperature and pressure of the primary system increase uncontrollably. When this occurs, protective systems come into operation to trip the reactor and/or to open steam dump and load bypass valves in order to avoid an overpressurization in the primary and secondary systems. If the uncontrolled increase in pressure is not avoided by these measures, the safety pressure valves of either the primary or the secondary side are caused to lift. This is an undesirable occurrence since it generally puts the system out of operation until the seals of the safety valves have been remachined and reseated. Another undesirable effect is that the reactor is tripped unnecessarily upon a large or rapid load rejection that otherwise would not require taking the reactor out of operation. Such a trip temporarily removes the nuclear power plant as a supplier and a time consuming and expensive reactor startup procedure must be followed before the reactor can be put back into operation as a power producer.

To better understand the dynamics of the secondary system, it is helpful to refer to curve 1 of FIG. 2 which shonws the typical steady state functional relationship between the secondary pressure and reactor power or load. When the reactor power is at zero, the steam generator hot standby secondary pressure is maintained at a maximum value of 1,000 psi. When the reactor power is increased through the values from 0 to 100%, the secondary pressure falls from its initial value of 1,000 psi to a final value of 900 psi. The ordinary secondary coolant system protection system safety valves would have a fixed pressure setpoint of about 1100 psi. This setpoint is designed to protect the integrity of the secondary coolant system only and is not designed to protect the primary coolant system. The occurrence of a load rejection which involves either a large load decrease or a large rate of load decrease from a full power of 100% might raise the secondary pressure off of the steady state curve to a value which remains below the fixed secondary pressure setpoint while at the same time causing the pressure in the primary coolant system to increase to a unacceptable value which would require a reactor trip.

2. Description of the Prior Art

One previously employed method for protecting the coolant systems has been to monitor the primary pressure and either trip the reactor at a predetermined pressure setpoint or to lift the primary systems pressure safety valves. This method has the fundamental disadvantage that the reactor is forced to discontinue operation on the occurrence of a temporary load reduction with an interruption of the generation of electrical energy. One solution to this drawback is to over design the system to provide the capability of handling large pressure excursions. An additional disadvantage is that even when the reactor is tripped upon a high primary pressure, a pressure higher than the pressure setpoint cannot be avoided because of the thermal and mass inertia effects of the energy backup previously discussed. A possible solution to the pressure overshoot would be to establish an unrealistically and uneconomically conservative pressure setpoint.

A second method that is commonly incorporated to handle a complete load rejection is to initiate an automatic reactor trip whenever a serious load rejection occurs. This method has the disadvantage that the nuclear power system becomes available for the continued generation of electrical energy only after involved and expensive reactor startup procedures have been completed. Such a practice necessitates considerable expense, trouble and delay regardless of the fact that many of the problems which cause load rejections are temporary or are easily detected and rapidly remedied.

One cause for increased primary pressure is the sudden expansion of the primary coolant due to a rapid increase in its temperature. Thus, in order to prevent a reactor trip on high primary pressure, the magnitude of primary coolant temperature increase must be kept under a certain value. One way to accomplish this is to find a means of limiting the increase in primary coolant average temperatue to a value that is rathr independent of the power level. It is also desirable that this means be able to anticipate said increase when it is due to a disturbance in the load. Secondary pressure is a parameter which is very responsive to load changes. In addition, there is a magnitude correspondence between this type of secondary pressure increase and the resulting increase in primary coolant average temperature. Therefore, if the secondary pressure is controlled in the event of a load rejection so as to limit the magnitude of its increase, the primary pressure can be kept from reaching its trip value. The maximum allowable increase in secondary pressure for this purpose is almost constant through the power range. Hence, if the steam dump and/or load bypass valves are controlled so as to prevent the secondary pressure from increasing from its initial value by that maximum amount, a reactor trip on high primary pressure can be averted.

SUMMARY OF THE INVENTION

The incorporation of a steamdump valve system or a load bypass valve system into the secondary coolant circuit, operating in conjunction with the turbine and the reactor, enables the prevention of the excessive pressures in both the primary and secondary systems, thereby enabling the reactor to stay operational regardless of partial or even complete load rejections. The bypass valves or steam dump valves operate to supply a substitute load in the case that a load rejection causes an energy backup which would ordinarily cause the pressure limits of the secondary or primary coolant circuits to be violated. The substitute load limits the energy backup by removing excess energy from the system. In the instant invention, the steam relief valves, including load bypass and/or steam dump valves, are actuated by a pressure program which is functionally dependent on the load placed on the system. In this way, the secondary pressure setpoint program can protect against undesirable conditions in both the primary and secondary sides even though only signals from the secondary side are monitored. One possible indication of load is the secondary coolant rate of flow. The functional relationship of the program is derived from the steady state curve of power or load versus secondary pressure. The secondary pressure setpoint program is generated by a linear approximation to the steady state curve of secondary pressure versus load above 15 or 20% displaced by an amount equivalent to the maximum transient secondary pressure increase expected to result from a 10% load rejection. This secondary pressure setpoint program is limited to a maximum value that corresponds to the pressure at which the secondary coolant circuit is maintained in a standby condition when the reactor power is 0%.

The actual secondary pressure is measured and compared to the variable setpoint which has been generated for the existing load. From this comparison, an error signal is generated and the steam relief valves are actuated by means of a controller responding to this error input. The load signal may be lagged in order not to raise the pressure setpoint too rapidly upon the occurrence of a rapid and large load rejection. This lagging allows the control system to respond faster to pressure increases resulting from load rejections.

This type of steam dump and/or load bypass control system, being responsive to an abnormal increase in secondary pressure, will operate not only when a load rejection occurs, but whenever a mismatch in reactor power and steam generator load causes an energy buildup in the nuclear steam supply system. An uncontrolled rod withdrawal incident, for example, or a failure in the Reactor Regulating System that results in an unwarranted increase in reactor power will produce an energy buildup which will open the dump/bypass valves. Since in all cases the opening of the dump/bypass valves is due to excess stored energy in the nuclear steam supply system a valve opening demand can be construed as an indication to block any increase in reactor power. For this purpose, this invention further provides an automatic control rod withdrawal prevent which prevents control rod withdrawal whenever there exists any signal indicative of a load bypass valve opening demand. The automatic control rod withdrawal prevent consists of an "OR" gate responsive to any input signal indicative of a valve demand and means for blocking the withdrawal of rods when the "OR" gate passes a signal.

DESCRIPTION OF THE DRAWINGS

FIG. 1 is a chart indicating the permissible regions of operation of a nuclear reactor under normal automatic control with the rate of load decrease represented on the abscissa and the magnitude of load decrease represented on the ordinate;

FIG. 2 is a plot of (1) the steady curve of load vs. secondary pressure, (2) a curve of the variable secondary pressure setpoint, and (3) the prior art fixed setpoint; and FIG. 3 is a schematic diagram of a nuclear power generating system showing the secondary coolant circuit bypass valve and its control system with reactor rod withdrawal prevent interlock.

DESCRIPTION OF THE PREFERRED EMBODIMENT

An examination of FIG. 1 reveals a chart of rate of load decrease vs. magnitude of load decrease. This chart is divided into three regions. Region I indicates the possible modes of operation of a nuclear power plant with the normal reactor and pressure control systems. Operation of the Nuclear Steam Supply System within Region I results in no excessive temperatures or pressures which would cause either a reactor trip or the opening of safety valves. Region II indicates the area which becomes available for operation if load bypass valves are provided with the control system described. This region is limited by the fact that the load bypass valve has the capability of opening from full-closed to full-open in a relatively lengthy period of nearly 20 seconds. Region III completes the area of acceptable operation that would become available if the load bypass valves were able to be operated from full-closed to full-open in a period of 1 or 2 seconds. This invention provides a method of operation with steam relief valves in the nuclear power system which enables the full utilization of operating regions I and II of FIG. 1.

The nuclear power system relevant to the instant invention can be seen in FIG. 3. The power reactor 10 has core 12 which is controlled by control rods 14 which penetrate the reactor shell 10. The control rods 14 are actuated by driving means 16. The reactor 10 and core 12 is cooled by the primary coolant system (generally indicated by 18) which provides a continuous flow of primary coolant to and from the reactor 10. The coolant exits the reactor 10 at exit nozzle 20 and is circulated to a heat exchanger 22 where it gives up some of its heat to the secondary coolant system generally indicated by 24. After passing through the heat exchanger 22, the primary coolant is returned to the reactor 10 through pump 26 and inlet nozzle 28.

The heated secondary coolant, which is usually water, is caused to pass in its vapor form through pressure pipe system 30 to the load or turbine 32. After passing through the turbine 32, the vapor or steam is quenched in condenser 34 and eventually returned through pressure pipe 36 via feed water pump 38 to the heat exchanger 22. Turbine or load bypass valves 40 are provided to allow the shunting of the coolant vapor or steam through pipe 42 and 44, past the turbine 32 and to the condenser 34.

The load bypass valve control means (generally indicated by 46) consists of pressure sensor 48, coolant flow sensor 50, lagging means 52, pressure setpoint programmer 54, summation means 56, and valve controller 58. Also provided is an "OR" gate 60 whose input is any signal indicative of a bypass valve demand and interlocking means 62 which prevents the withdrawal of rods 14 from the core 12 upon receipt of a signal from "OR" gate 60. The operation of the bypass valve control is as follows. Secondary coolant flow sensor 50 detects the secondary coolant flow through the secondary coolant system 24. Steam flow is used as a power or load index of the secondary system. The sensor 50 generates a signal commensurate with secondary coolant flow which is in turn commensurate to the load of the system and transmits this signal to a lagging means 52 which causes the transmission of the signal to be lagged. After the signal has been lagged, the signal from lagging means 52 is transmitted to pressure setpoint programmer 54 which has been preprogrammed to generate a pressure setpoint signal which varies according to the magnitude of the load input signal. A particular program that programmer 54 could follow and which is suggested as the preferred embodiment can be seen as curve 2 in FIG. 2. Curve 2 has been derived in advance by linearly approximating part of the steady state secondary pressure vs. power curve 1. It has then been displaced by a pressure increment equivalent to a pressure jump to be expected from a 10% load rejection. For values of flow indicative of a load less than about 20% of the full load curve 2 is horizontal and has a value of 1000 psi which is the secondary pressure that is maintained in the secondary coolant system 24 during hot standby when the load is zero. Curve 3 in FIG. 2 is an indication of a fixed setpoint used by the prior art for preventing excessive pressures in the secondary coolant system 24 only.

At this point, a better understanding of the invention may be gained by examining the behavior of the secondary and primary coolant systems when a load rejection of greater than 10% occurs. Assuming that the reactor has been operating in its steady state condition at 100% power, the secondary pressure would be maintained at approximately 900 psia. This condition would be represented on curve 1 at point B. The pressure setpoint generated by programmer 54 would be equivalent to a pressure as indicated by point C. On the occurrence of a load rejection of 10%, the signal indicating the change of flow in the secondary coolant system 24 would be lagged by lagging means 52 and the pressure setpoint would move towards point D on curve 2 according to the time constant of lagging. The actual pressure of the secondary coolant system 24 would increase to a pressure in the vicinity of that indicated by point C. A load rejection of this magnitude would not cause the bypass valves to open since the pressure of the secondary coolant system has not exceeded the setpoint.

Upon the occurrence of a load rejection larger than 10%, the actual secondary pressure may increase to a point indicated by point A. Such an occurrence would cause the load bypass valves to open, thereby bypassing excess steam through valve 40 to condenser 34. This bypassing action reduces the secondary pressure and brings it down to a point equal to or below the setpoint then existing at which time the bypass valves would be fully closed again. As can be seen from FIG. 2, a load rejection which causes the secondary pressure to increase to point A would not cause a violation of the prior art setpoint and, therefore, no corrective action would be taken by the prior art. A secondary pressure which has been increased in prior art systems to point A would cause an energy backup, as discussed above, which would cause an increase primary pressure. The increased primary pressure might exceed the safe operating pressure for the primary coolant system 18 and cause either a reactor trip and/or a lifting of the primary coolant system's safety valves. Either occurrence would cause the reactor 10 to be temporarily nonoperational. However, with the instant invention, a secondary pressure at point A would have exceeded the pressure setpoint as established by programmer 54 and excessive energy would have been drained from the system thereby preventing a reactor trip.

Continuing the discussion of the operation of the load bypass valve control system 46, the pressure setpoint lying somewhere along curve 2 in FIG. 2, depending on load, is transmitted to summation point 56. At the summation point 56 the pressure setpoint is compared to the actual pressure of the secondary coolant system 24 which has been detected by detector 48 and transmitted to summation point 56. Summation point 56 generates and transmits a pressure error signal which causes the controller 58 to actuate bypass valves 40 to bring the secondary pressure down to its setpoint value.

At the same time, a signal is sent to "OR" gate 60 from bypass demand sensor 61 which senses as positive signal at the output of controller 58. "OR" gate 60 is responsive to any signal which is indicative of a demand for load bypass valve 40 opening. Examples of alternative signals to which "OR" gate 60 might respond are signals derived from the flow sensor 50 or from a signal indicative of a change or a rate of change of flow or a change or a rate of change of pressure. Upon the receipt of any signal which indicates bypass valve demand, the "OR" gate 60 passes a signal to interlock means 62 which automatically prevents the withdrawal of rods 14 by control means 16.

This invention is practiced with the electrical portions of the control system embodied as analog control circuitry or as digital control circuitry. When digital hardware is employed, a programmed digital process computer can be included in the control circuitry.

It will be understood that the embodiment shown and described herein is merely illustrative and that changes may be made without departing from the scope of the invention as claimed.

What is claimed is:

1. A control rod interlock system for a nuclear power plant having a nuclear reactor with a core and control rods for controlling the power output thereof, and having a working fluid circuit for providing the working fluid to a load, and having steam relief valves for diverting the working fluid around the load, the interlock system comprising:
   a. means responsive to said working fluid for detecting a condition of said working fluid;
   b. means responsive to said detecting means for generating a signal indicative of a steam relief valve demand; and
   c. means responsive to said signal indicative of steam relief valve demand for preventing the movement of said control rods out of said core of said reactor.

2. A control rod interlock system for a nuclear power plant having a nuclear reactor with a core and control rods for controlling the power output thereof, and having a primary fluid circuit for circulating a coolant through the reactor core, a secondary fluid circuit in heat exchange relation with the primary fluid circuit to provide secondary fluid to a load, and steam relief valves for allowing the secondary fluid to passed around the load, the interlock system comprising:
   a. means responsive to the fluid pressure of said secondary circuit for generating a signal for actuating said steam relief valves;
   b. means responsive to the fluid flow of the secondary circuit for generating a signal for actuating said steam relief valves;
   c. means responsive to the signals of said means responsive to the fluid pressure of said secondary circuit for generating a signal for actuating said steam relief valves or to the signals of said means responsive to the fluid flow of the secondary circuit for generating a signal for actuating said steam relief valves for generating a digital signal indicative of the existance of any single steam relief valve demand signal; and
   d. means responsive to said means for generating a digital signal indicative of the existance of any single steam relief valve demand signal for preventing the movement of said control rods out of the core of said reactor.

3. A control rod interlock system as recited in claim 2 wherein said means responsive to said means responsive to the fluid pressure of said secondary circuit for generating a signal for actuating said steam relief valves or to the signals of said means responsive to the fluid flow of the secondary circuit for generating a signal for actuating said steam relief valves is an "OR" gate.

* * * * *